US010386128B2

(12) United States Patent
Hofmann et al.

(10) Patent No.: US 10,386,128 B2
(45) Date of Patent: Aug. 20, 2019

(54) COLLECTOR AND ASSOCIATED HEAT EXCHANGER

(71) Applicant: Mahle International GmbH, Stuttgart (DE)

(72) Inventors: Herbert Hofmann, Stuttgart (DE); Matthias Seitz, Oberkochen (DE); Christian Wagner, Stuttgart (DE)

(73) Assignee: Mahle International GmbH (DE)

( * ) Notice: Subject to any disclaimer, the term of this patent is extended or adjusted under 35 U.S.C. 154(b) by 266 days.

(21) Appl. No.: 14/863,765

(22) Filed: Sep. 24, 2015

(65) Prior Publication Data
US 2016/0091252 A1 Mar. 31, 2016

(30) Foreign Application Priority Data
Sep. 25, 2014 (DE) .................. 10 2014 219 387

(51) Int. Cl.
*F28F 9/02* (2006.01)
*F28D 1/053* (2006.01)
*F28F 1/00* (2006.01)
*F28F 1/04* (2006.01)
*F28F 1/22* (2006.01)
(Continued)

(52) U.S. Cl.
CPC ........ *F28F 9/0224* (2013.01); *F28D 1/05366* (2013.01); *F28F 1/00* (2013.01); *F28F 1/04* (2013.01); *F28F 1/22* (2013.01); *H01M 10/6556* (2015.04); *F28D 2021/0043* (2013.01); *H01M 2220/20* (2013.01)

(58) Field of Classification Search
CPC ... H01M 10/6556; F28D 1/05366; F28F 1/04; F28F 3/12; F28F 9/0219; F28F 9/0224

USPC .......................................................... 165/173
See application file for complete search history.

(56) References Cited

U.S. PATENT DOCUMENTS

| 4,938,284 A | * | 7/1990 | Howells ................. F28F 9/001 |
| | | | 165/149 |
| 5,025,855 A | * | 6/1991 | Hoshino ................. B21C 37/22 |
| | | | 165/110 |

(Continued)

FOREIGN PATENT DOCUMENTS

| DE | 3752324 T2 | 3/2001 |
| DE | 102008027293 A1 | 12/2009 |

(Continued)

OTHER PUBLICATIONS

English abstract for DE-102011005236.
English abstract for DE-102011080499.
English abstract for DE-102012223125.

*Primary Examiner* — Jason N Thompson
(74) *Attorney, Agent, or Firm* — Fishman Stewart PLLC

(57) ABSTRACT

A collector for accommodating at least two flat tubes of a heat exchanger, which are disposed so as to be mutually parallel and each of which has a broad side and a narrow side, may include a first element and a second element. The first element may be configured as a metal strip, and the second element may be configured as one of an extruded section or a formed sheet-metal part. At least two punched through openings each configured as a passage for receiving one of the flat tubes may be provided in at least one of the first element and the second element. The at least two punched through openings may further be oriented parallel to a longitudinal axis of the collector by way of the broad side of the flat tubes.

20 Claims, 3 Drawing Sheets

(51) Int. Cl.
  *H01M 10/6556* (2014.01)
  *F28D 21/00* (2006.01)

(56) References Cited

U.S. PATENT DOCUMENTS

| | | | | | |
|---|---|---|---|---|---|
| 5,127,466 | A | * | 7/1992 | Ando | F28F 9/002 165/153 |
| 5,238,059 | A | * | 8/1993 | Smith | F28F 9/0224 165/153 |
| 5,297,624 | A | * | 3/1994 | Haussmann | F25B 39/04 165/173 |
| 5,450,896 | A | * | 9/1995 | Bertva | F28F 9/002 165/153 |
| 6,223,812 | B1 | * | 5/2001 | Gough | F28D 1/05366 165/173 |
| 6,446,713 | B1 | * | 9/2002 | Insalaco | F28D 1/05366 165/173 |
| 7,201,218 | B2 | * | 4/2007 | Hiyama | F28F 9/0224 165/173 |
| 8,790,808 | B2 | | 7/2014 | Herrmann et al. | |
| 8,985,193 | B2 | * | 3/2015 | Hirsch | F28F 9/0224 165/149 |
| 2004/0069469 | A1 | * | 4/2004 | Kato | F28D 1/05366 165/151 |
| 2005/0150108 | A1 | * | 7/2005 | Demuth | B21C 37/0803 29/890.038 |
| 2008/0023183 | A1 | * | 1/2008 | Beamer | F28F 9/0224 165/174 |
| 2011/0132580 | A1 | * | 6/2011 | Herrmann | F28F 3/12 165/104.33 |
| 2011/0272121 | A1 | * | 11/2011 | Suzuki | H01L 23/473 165/104.19 |
| 2014/0048230 | A1 | * | 2/2014 | Hirsch | H01M 6/5038 165/80.1 |

FOREIGN PATENT DOCUMENTS

| | | |
|---|---|---|
| DE | 102011005236 A1 | 9/2012 |
| DE | 102011080499 A1 | 2/2013 |
| DE | 102012223125 A1 | 4/2014 |
| WO | WO-2007/048889 A1 | 5/2007 |

* cited by examiner

COLLECTOR AND ASSOCIATED HEAT EXCHANGER

CROSS-REFERENCE TO RELATED APPLICATIONS

This application claims priority to German Patent Application No. 10 2014 219 387.7, filed Sep. 25, 2014, the contents of which are hereby incorporated by reference in their entirety.

TECHNICAL FIELD

The present invention relates to a collector for accommodating at least two flat tubes of a heat exchanger, which are disposed so as to be mutually parallel. The invention moreover relates to a heat exchanger having at least one such collector.

BACKGROUND

In heat exchangers used for refrigerant applications the lines carrying refrigerant are typically embodied as flat tubes. The latter on the side of the longitudinal ends are in each case accommodated in a collector tube or a collector, respectively. Additional cooling requirements are created here particularly in the field of hybrid or electric vehicles, for example for cooling a vehicle battery, whereby a battery cooler of this type in the context of the changeover to the R744-type ($CO_2$) refrigerant has be to re-designed on account of the higher system pressures and the simultaneously lower mass flow rates. In order to be able to ensure sufficient resistance to pressure also in the long term, the concepts which have been carried over from evaporators/condensers have to be downsized to smaller cross sections.

Furthermore, integral collector solutions exist for refrigerants based on fluorocarbon. Said integral collector solutions are based on concepts which are usual in condensers, whereby adapting the concepts which have been carried over from evaporators/condensers to integral collectors having a significantly smaller cross section requires extremely complex punching solutions, since internal bracing can be implemented only with difficulty. Passages cannot be fitted in the case of an internal matrix, since the internal diameter is too small. In the case of a two-part collector solution, the passages of the R134A-type condenser solution to date cannot be produced at the required smaller diameters and simultaneously larger wall thicknesses, this being particularly disadvantageous since these passages serve as introduction ramps for the flat tubes and moreover improve the capability of the individual parts for coffering. Moreover, problems in terms of strength and joining of the collector are to be expected.

SUMMARY

The present invention thus addresses the object of providing an improved or at least an alternative embodiment for a collector and for a heat exchanger of the generic type, which in particular is employable for the new refrigerant of the R744-type.

This object is achieved according to the invention by the subject matter of the independent claims. Advantageous embodiments are the subject matter of the dependent claims.

The present invention is based on the general concept of configuring a collector for accommodating at least two flat tubes of a heat exchanger, in particular of a battery cooler, in a motor vehicle, which two flat tubes are disposed so as to be mutually parallel, from two elements, in particular from two half-shells, wherein the first element is configured as a metal strip and the second element is configured as an extruded section or as a formed/bent sheet-metal part, and wherein punched through openings which are in particular configured as a passage for receiving the flat tubes are preferably provided in the first element. The through openings here by way of their longitudinal direction extend so as to be parallel with the longitudinal axis of the collector and thus so as to be orthogonal in relation to the previously known orientation. On account of this orientation of the through openings, the flat tubes, which have a broad side and a narrow side, are also trapped in said collector so as to be oriented, by way of the broad side of said flat tubes, parallel with the longitudinal axis of the collector. On account thereof, optimized heat transfer may be achieved on battery cells, for example. Moreover, the heat exchanger is smaller in construction on account of this orientation of the flat tubes. The collector serves for charging and discharging the refrigerant which is distributed to the flat tubes by the collector. The through openings in the first element which may be configured in particular as a metal strip here are manufactured by means of a forming method, in particular by means of a punching method, in which the passages are punched towards the inside or the outside. In general, other production methods, for example metal-cutting methods, are also conceivable. In purely theoretical terms, the through openings/passages of course may also be provided in the second element. On account of forming taking place when the through openings, which are configured as passages, are created, the solder-plated side of the first element of the collector may be brought into contact with the flat tube, on account of which improved soldering may be achieved. Alternatively, sheet-metal panels which are so thick (approx. 1.5 to 2.5 mm) that a passage need not be manufactured may also be used, of course. In this case, only a groove may serve for receiving the flat tube, said groove however, on account of the thickness of the sheet-metal panel, also offering the required resistance to pressure and area for soldering.

Alternatively, it may also be provided that the two elements on the internal side have the same internal radius/collector radius. The basic concept of this collector design is for the design to approximate a circular internal cross section, since this represents an optimized solution in terms of strength. An ideal circular shape would be even better but is not implementable in terms of production technology. The alternative collector design offers the advantage of being manufacturable, on the one hand, and of having a strength step which is as minor as possible, on the other hand.

The embodiment of the collector according to the invention here enables a configuration which is highly stable under pressure, on the one hand, and comparatively simple production, on the other hand, since the passages or through openings having no further bracing, respectively, in the first element are comparatively easy to manufacture. On account of the two-part embodiment, collectors which are comparatively small, having for example an internal collector diameter of less than 12 mm and in particular of less than 10 millimeters, may also be manufactured, at which diameters the associated passages or through openings, respectively, could not be manufactured as in previous solutions. Production of such a passage in a round tube or in a half-shell given these cross sections is possible only under certain conditions. The collector according to the invention, or the heat exchanger according to the invention, respectively, enables the concept previously known in evaporators/condensers to thus be carried over to cross sections which are smaller and suitable for the new R744-type refrigerant, such that also battery coolers which may readily endure the high pressure which arises in the use of R744 are manufacturable.

In one advantageous refinement of the solution according to the invention, the at least one flat tube of a heat exchanger according to the invention equipped with a collector of this type has a shoulder which serves as a stop during plugging into the associated through opening or the associated passage, respectively, of the first element (metal strip). On account thereof, particularly simple yet at the same time highly precise production of the heat exchanger is possible, since such a shoulder indicates in a haptic manner that the final production position has been reached. In particular the production process may be optimized on account thereof.

The second element expediently has a groove in which the metal strip is guided in a form-fitting manner. A groove of this type thus enables fitting of the collector by inserting the punched metal strip into the groove and subsequent materially integral connecting, for example by means of adhesive bonding, welding, or soldering. An unequivocal position is thus predefinable by way of the groove, likewise having a positive influence on production quality. It is conceivable here for the groove to be already disposed on the second element, or else for noses to be initially disposed on the second element, which after connection to the first element, which is configured as a metal strip, formed bent, the actual groove being formed only on account thereof. Production of both the groove as well as of the formable noses here is possible in a comparatively simple manner, in particular as long as the second element is configured as an extruded section, for example. The second element may also have a step for positioning the first element. In one advantageous refinement of the solution according to the invention, the second element has a substantially Ω-shaped (omega-shaped) design. An Ω-shaped design of this type enables a comparatively round construction of the collector per se and thus an embodiment which is stable under pressure, the legs of the Ω taking over as the connection to the metal strip. On account of the round shape, in particular in the region of the flow duct, high resistance to pressure may be achieved.

The metal strip (first element) is expediently retained in a form-fitting manner on the second element by a clip-type connection. A clip-type connection of this type may be configured by a corresponding groove in the second element and associated introduction ramps, for example, actual clipping of the metal strip to the second element being performed by way of the introduction ramps. Alternatively, the metal strip may also be pushed into the groove, of course. In order for the collector or the collector tube, respectively, to be sealed, it is a common feature of all embodiments here that a materially integral connection must also be performed in any case after the form-fitting connection has taken place. A clip-type connection of this type should however simplify fitting of the metal strip to the second element and at the same time define in a haptic manner a desired final position by latching or clipping, respectively.

In one further advantageous embodiment of the solution according to the invention, the collector has at least one separation wall which subdivides the collector into a plurality of segments. In the case of such segmentation, the entire collector may be subdivided into a plurality of individual collectors which may then be interconnected by way of sleeves, for example. However, in the case of large spacing of the flat tubes it may be more economical for a plurality of individual collectors to be disposed and used in a coaxial manner in relation to one another. By means of separation walls of this type a flow streaming into the collector may be influenced in particular in terms of direction and/or flow rate.

Further important features and advantages of the invention are derived from the dependent claims, from the drawings, and from the associated description of the figures by means of the drawings.

It is to be understood that the features which have been mentioned above and which are yet to be explained hereunder are not only usable in the combination which is stated in each case but also in other combinations or individually, without departing from the scope of the present invention.

Preferred exemplary embodiments of the invention are illustrated in the drawings and will be explained in more detail in the following description, same reference signs referring to same or similar or functionally identical components.

DETAILED DESCRIPTION

Figure 6:
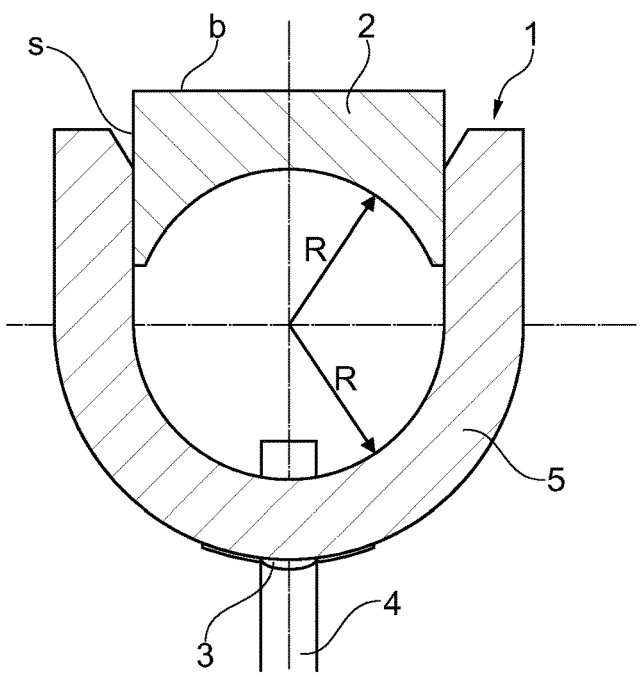
FIG. 6 shows a sectional illustration through a further embodiment of a collector according to the invention.

According to FIGS. 1 to 4 and 7, a collector 1 according to the invention has a first element 2, which is substantially configured as a flat metal strip, having corresponding through openings/passages 3 for flat tubes 4, and a second element 5. The metal strip (first element 2) and the second element 5 here are interconnected in both a form-fitting manner as well as in a materially integral manner, for example by adhesive bonding, soldering, or welding. The flat tubes 4 have a broad side b and a narrow side s, and by way of the broad side b thereof are oriented so as to be parallel with the longitudinal axis 15 of the collector 1. On account thereof, optimized heat transfer may be achieved on battery cells 12, for example. Moreover, the construction size of the heat exchanger 1 is smaller on account of this orientation of the flat tubes 4. The through openings 3 here are preferably disposed in the first element 2, however they may alternatively also be disposed in the second element 5, as is illustrated in FIG. 6. Moreover, the through openings/passages 3 are manufactured by means of a punching or metal-cutting method.

It may alternatively also be provided for the two elements 2, 5 to have on their internal side the same internal radius/collector radius R. The basic concept of this collector design is for the design to approximate a circular internal cross section, since this represents an optimized solution in terms of strength. An ideal circular shape would be even better but is not implementable in terms of production technology. The alternative collector design offers the advantage of being easily manufacturable in terms of strength, on the one hand, and of having a strength step which is as minor as possible, on the other hand.

On account of the construction of the collector 1 according to the invention, the concepts which are already known from previous evaporators/condensers may be carried over to comparatively small collectors 1 which at the same time resist high pressures, on account of which the use of R744 as a refrigerant is possible. The collector 1 according to the invention here may in particular be a component part of a heat exchanger 6 which is configured as a flat cooler, for example. The collector 1 serves for charging and discharging refrigerant and distributes the latter to the individual flat tubes 4. Here, at least one flat tube 4 may have at least two parallel flow ducts which are simple to manufacture by the extrusion method. The flat tubes 4 are inserted perpendicularly to the longitudinal direction 15 of the collector by way of the passages/through openings 3 thereinto. In order to be able to achieve good solderability and thus also optimal sealing, not only through openings 3 but in fact passages having an enlarged contact area are to be strived for. Given a corresponding sheet-metal thickness of the first element 2, grooves will also be sufficient.

The wall thickness of the first element 2 and/or of the second element 5 may vary in the circumferential direction. The advantage of a variable wall thickness lies in being able to meet refrigerant-specific and customer-specific requirements in terms of strength in a manner which is optimal in terms of weight/installation space.

The flat tubes 4 here have the following dimensions, for example: broad side b between 10 and 40 mm, narrow side s between 1 and 3 mm, and a wall thickness between 0.3 and 0.7 mm. In order for the passages/through openings 3 here to be able to be produced as simply as possible, said passages/through openings are produced by way of a forming process, in the present case by means of punching. In purely theoretical terms, it is self-evident that other production methods, such as a metal-cutting method, for example are also conceivable. In the case of the dimensions which are required for the R744-type refrigerant, that is to say an internal diameter of the collector 1 of less than 12 mm and in particular of less than 10 mm, the passages/through openings 3 cannot be manufactured as in the case of previous solutions. Production of the passage 3 by means of a forming process, for example in a round tube or a half-shell, is therefore not possible, which is why the metal strip 2 which according to the invention is planar or flat, respectively, is provided to this end.

Figure 1:
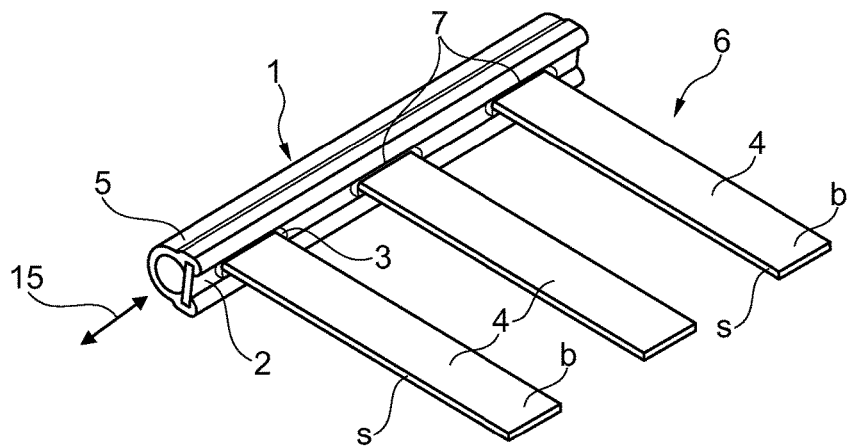
FIG. 1 shows a collector according to the invention, having flat tubes plugged thereinto.

When observing the flat tubes 4 according to FIG. 1 it can be seen that said flat tubes 4 have a shoulder 7 which serves as a stop during plugging into the associated through opening/passage 3. In this way, reaching the final position is indicated in a haptic manner.

Figure 2:
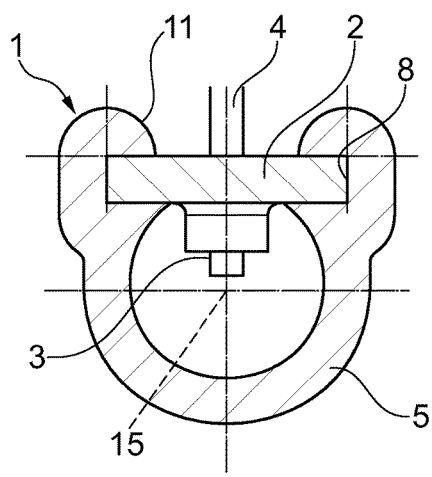
FIG. 2 shows a sectional illustration through a first embodiment of a collector according to the invention.

When observing FIG. 2 it can be seen that in this embodiment the second element 5 has a substantially Ω-shaped design, likewise a groove 8 in which the metal strip 2, that is to say the first element 2, is retained in a form-fitting manner. Placing or inserting, respectively, the first element 2 into the groove 8 here may be performed by introducing the former along the groove 8 or else by depressing the former, during which the two Ω-legs of the second element 5 are outwardly reshaped and encompass the metal strip 2 on the side of the periphery, if and when the metal strip 2 has been clipped into the groove 8. The metal strip 2 is thus retained in a form-fitting manner by way of a type of clip-type connection on the second element 5.

A clip-type connection of this type simplifies fitting, wherein the metal strip 2 additionally may be stabilized by reinforcements. To this end, corrugations in the metal strip 2 or a slightly bent metal strip 2 are particularly suitable. The clipping force which is required for establishing the connection to the second element 5 is mainly influenced by the undercut of the second element 5, or the groove 8 thereof, respectively. The geometry of the undercut has to be devised according to the permissible fitting force. To this end, introduction ramps 11 may be applied, for example. Alternatively, it is of course also conceivable for the metal strip 2 to be placed and the yet projecting noses to be bent thereafter.

Figure 3:
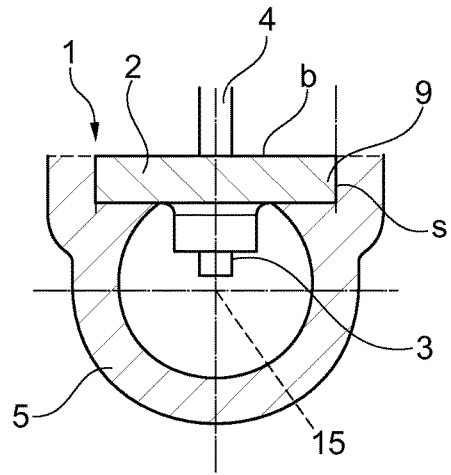
FIG. 3 shows an illustration as in FIG. 2, however in an alternative embodiment.
Figure 4:
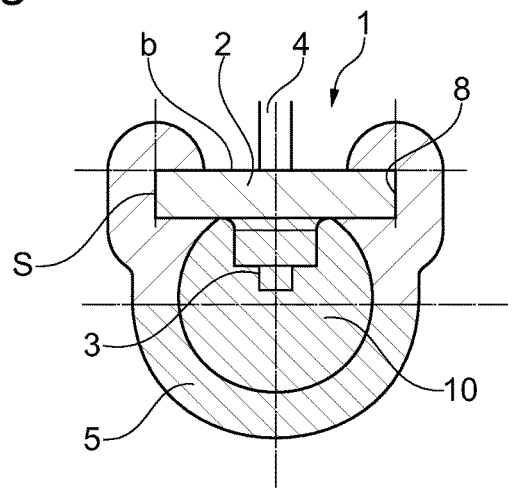
FIG. 4 shows an illustration as in FIG. 2, however having an additional separation wall.

Alternatively thereto, the collector 1 according to FIG. 3 has no groove 8 but only a clearance 9 or a step, respectively, in which the metal strip 2 is received in a form-fitting manner. Here too, welding or soldering, respectively, or adhesive bonding is to follow, of course, such that the metal strip 2 is connected to the second element 5 in a form-fitting manner.

In order for various flow paths to be mutually separated, it is moreover possible for separation walls 10 to be used depending on the numbers/variability required, or for the collector 1 to be segmented in general. If and when separation walls 10 (cf. FIG. 4) are used, they have to be introduced into the collector 1. To this end, external separation walls 10 (fitted from the outside after the second element 5 has been fitted with the metal strip 2) and internal separation walls 10 (separation walls 10 which are fitted prior to the fitting of the second element 5 with the metal strip 2) are suitable. If and when external separation walls 10 are used, the second element 5 is configured so as to be slotted, whereas in the case of internal separation walls 10, due to the positioning required for the separation wall 10, a corresponding groove has to be provided in the metal strip 2. By means of separation walls 10 of this type segmentation of the entire collector 1 into a plurality of individual collectors which can then be interconnected by sleeves, for example, is also possible. In the case of comparatively large spacing of the flat tubes it may however also be more economical for a plurality of individual collectors 1 to be placed behind one another in a coaxial manner.

Figure 5:
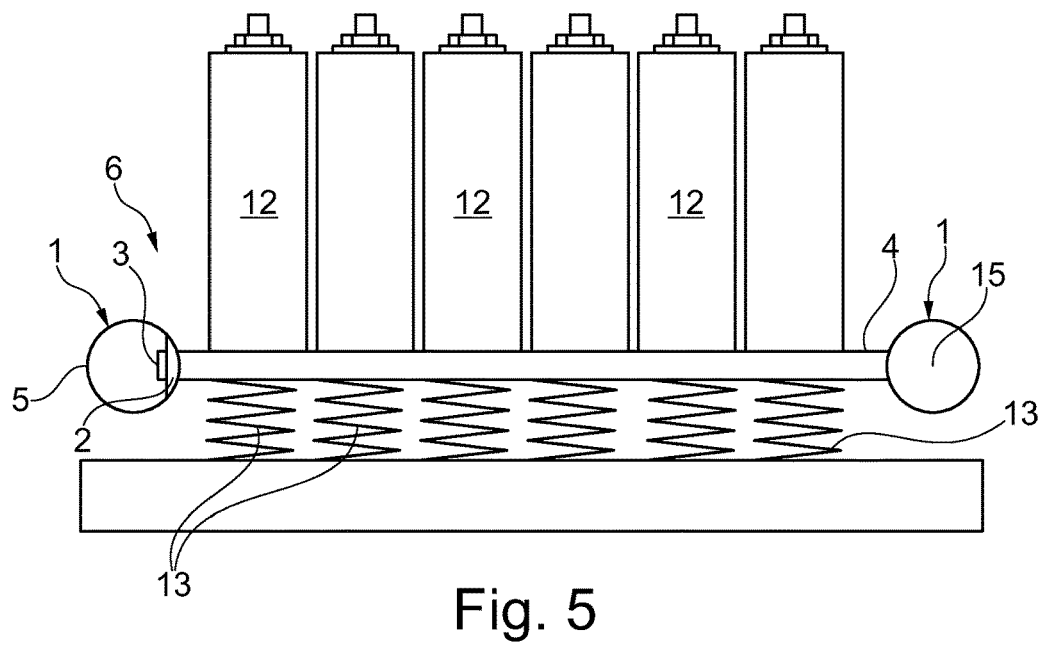
FIG. 5 shows a heat exchanger configured as a battery cooler, having two such collectors.

Finally, when observing FIG. 5, a heat exchanger 6 which is configured as a battery cooler and which by way of the flat tubes 4 thereof is in heat-conducting contact with individual battery cells 12 can be seen. Contact with the battery cells 12 here may be supported by additional components, such as spring elements 13, for example. Of course, the heat exchanger 6 in the drawing may optionally also be manufactured so as to have a cover plate. A heat exchanger 6 which is configured as a battery cooler may be employed in particular in a motor vehicle 14.

Figure 7:
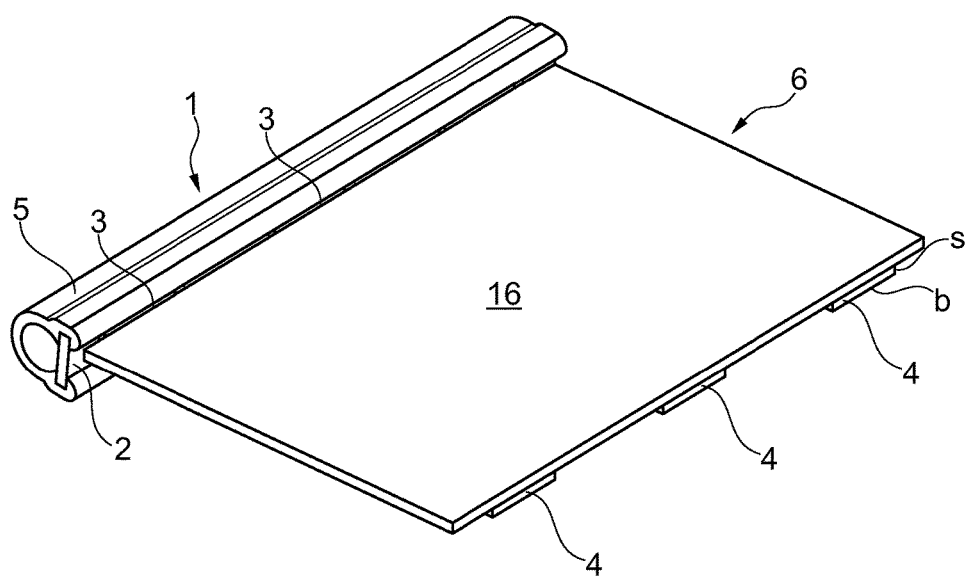
FIG. 7 shows a collector according to the invention, having flat tubes plugged thereinto and a heat-conducting plate connected thereto.

The flat tubes 4 here may also be connected in a mechanical or materially integral manner to one or a plurality of heat-conducting plates 16, as is illustrated in FIG. 7, for example. The objective of the cover plate or of the heat-conducting plate 16, respectively, is to improve the temperature profile in the transverse direction in that thermal resistance is reduced.

Overall, the heat exchanger 6 according to the invention or the collector 1 according to the invention, respectively, for the first time enables such a collector of previously known evaporator/condenser solutions to be carried over to what are now smaller geometries which are extremely stable under pressure, so that such a collector 1 and moreover also the heat exchanger 6 according to the invention are capable of being established in a cost-effective manner and at the same time can be employed for the R744-type refrigerant. Moreover, the heat exchanger 6 may be embodied with an expansion element so as to form a constructive unit therewith.

The invention claimed is:

1. A collector for accommodating at least two flat tubes of a heat exchanger, which are disposed so as to be mutually parallel and each of which has a broad side and a narrow side, the collector comprising:
a first element and a second element together defining an internal space, wherein the first element is configured as a metal strip and the second element is configured as one of an extruded section or a formed sheet-metal part, and wherein at least two punched through openings each configured as a passage for receiving one of the flat tubes are provided in at least one of the first element and the second element, and are oriented parallel to a longitudinal axis of the collector;
wherein the second element has a cross section with a partially annular portion and enlarged end portions, the enlarged end portions having a thickness greater than a thickness of the partially annular portion, wherein the second element has two grooves that receive the first element, wherein the grooves each has a first surface contacting a side of the first element facing the internal space and a second surface contacting a side of the first element facing away from the internal space, and wherein the first surface has a larger surface than the second surface.

2. The collector according to claim 1, wherein the first and second elements are held together by clipping.

3. The collector according to claim 2, wherein the first and second elements are interconnected in a materially integral manner by at least one of soldering, adhesive bonding, and welding.

4. The collector according to claim 1, wherein the first and second elements are interconnected in a materially integral manner by at least one of soldering, adhesive bonding, and welding.

5. The collector according to claim 4, wherein at least one of the first element and the second element in a circumferential direction has at least one of a constant wall thickness and a variable wall thickness.

6. The collector according to claim 4, wherein the second element has at least one of a step/clearance and a groove for positioning the first element.

7. The collector according to claim 1, wherein at least one of the first element and the second element in a circumferential direction has at least one of a constant wall thickness and a variable wall thickness.

8. The collector according to claim 7, wherein the second element has at least one of a step/clearance and a groove for positioning the first element.

9. The collector according to claim 1, wherein the second element has at least one of a step/clearance and a groove for positioning the first element.

10. The collector according to claim 1, further comprising at least one separation wall which subdivides the collector into a plurality of segments, wherein the separation wall is retained in at least one of a clearance and a slot of the collector.

11. The collector according to claim 1, wherein the first and second elements on respective internal sides have a same internal radius.

12. The collector according to claim 1, wherein at least a portion of the enlarged end portions are rounded to form introduction ramps facing away from the annular portion, the introduction ramps configured to enable a fitting force of the enlarged end portions to be overcome such that the first element may be introduced into the groove.

13. The collector according to claim 12, wherein the enlarged end portions have a curved shape.

14. The collector according to claim 1, wherein the enlarged end portions extend radially outward from the annular portion.

15. A heat exchanger comprising:
at least two flat tubes oriented parallel to each other, each flat tube having a narrow side and a broad side; and
at least one collector having a first element and a second element together defining an internal space, wherein the first element is configured as a metal strip and the second element is configured as one of an extruded section or a formed sheet-metal part, the first element being positioned between opposing walls of the second element, and wherein at least two punched through openings each configured as a passage for receiving one of the flat tubes are provided in at least one of the first element and the second element, and are oriented such that the broad side of each flat tube extends parallel to a longitudinal axis of the collector when inserted in a corresponding one of the at least two punched through openings;
wherein the second element has a cross section with a partially annular portion and enlarged end portions, the enlarged end portions having a thickness greater than a thickness of the partially annular portion, wherein the second element has two grooves that receive the first element, wherein the grooves each has a first surface contacting a side of the first element facing the internal space and a second surface contacting a side of the first element facing away from the internal space, and wherein the first surface has a larger surface than the second surface.

16. The heat exchanger according to claim 15, wherein at least one of the at least two flat tubes has a shoulder which serves as a stop during plugging into an associated one of the at least two punched through openings.

17. The heat exchanger according to claim 15, wherein the heat exchanger is configured as a battery cooler.

18. The heat exchanger according to claim 15, wherein the flat tubes are connected in a mechanical or materially integral manner to at least one heat-conducting plate.

19. The heat exchanger according to claim 15, wherein at least one of:
at least one of the at least two flat tubes has at least two parallel flow ducts; and
at least one of the at least two flat tubes is configured as an extruded section.

20. A battery module for a motor vehicle comprising:
a heat exchanger having:
at least two flat tubes oriented parallel to each other, each flat tube having a narrow side and a broad side; and
at least one collector having a first element and a second element together defining an internal space, wherein the first element is configured as a metal strip and the second element is configured as one of an extruded section or a formed sheet-metal part, and wherein at least two punched through openings each configured as a passage for receiving one of the flat tubes are provided in at least one of the first element and the second element, and are oriented such that the broad side of each flat tube extends parallel to a longitudinal axis of the collector when inserted in a corresponding one of the at least two punched through openings;

at least one battery cell; and at least one spring element configured to bias the heat exchanger by way of the flat tubes towards that at least one battery cell, so as to have heat-exchanging contact between the flat tubes and the at least one battery cell;

wherein the second element has a cross section with a partially annular portion and enlarged end portions, the enlarged end portions having a thickness greater than a thickness of the partially annular portion, the enlarged portions defining a groove in which the first element is retained in a form-fitting manner, the enlarged end portions extending radially outward from the annular portion; and wherein the second element has two grooves that receive the first element, wherein the grooves each has a first surface contacting a side of the first element facing the internal space and a second surface contacting a side of the first element facing away from the internal space, and wherein the first surface has a larger surface than the second surface.

\* \* \* \* \*